(12) United States Patent
Mihara et al.

(10) Patent No.: US 8,796,551 B2
(45) Date of Patent: Aug. 5, 2014

(54) POWER SUPPLY CONTROL DEVICE

(75) Inventors: Haruhiko Mihara, Tsu (JP); Shinichi Nakamura, Tsu (JP); Noboru Inagaki, Tsu (JP)

(73) Assignee: Panasonic Corporation, Osaka (JP)

( * ) Notice: Subject to any disclaimer, the term of this patent is extended or adjusted under 35 U.S.C. 154(b) by 174 days.

(21) Appl. No.: 13/215,440

(22) Filed: Aug. 23, 2011

(65) Prior Publication Data

US 2012/0048617 A1 Mar. 1, 2012

(30) Foreign Application Priority Data

Aug. 25, 2010 (JP) ................................. 2010-188634

(51) Int. Cl.
*H02G 15/02* (2006.01)
*H02G 15/08* (2006.01)

(52) U.S. Cl.
USPC ........................................................ 174/77 R

(58) Field of Classification Search
USPC ........................................................ 439/587
See application file for complete search history.

(56) References Cited

U.S. PATENT DOCUMENTS

| | | | | |
|---|---|---|---|---|
| 3,226,474 A | * | 12/1965 | Garnett et al. | 174/151 |
| 3,493,670 A | * | 2/1970 | Broadbelt et al. | 439/277 |
| 4,267,401 A | * | 5/1981 | Wilkinson | 174/77 R |
| 4,538,053 A | * | 8/1985 | Morrow et al. | 219/541 |
| 4,622,436 A | * | 11/1986 | Kinnan | 174/77 R |
| 5,155,303 A | * | 10/1992 | Bensel et al. | 174/93 |
| 5,235,138 A | * | 8/1993 | Shah et al. | 174/151 |
| 5,332,867 A | * | 7/1994 | Shaffer et al. | 174/151 |
| 5,573,429 A | | 11/1996 | Miyazaki et al. | |
| 5,593,320 A | * | 1/1997 | Konda et al. | 439/589 |
| 6,007,377 A | * | 12/1999 | Cook | 439/587 |
| 6,051,792 A | * | 4/2000 | Damm et al. | 174/93 |
| 6,180,882 B1 | * | 1/2001 | Dinh | 174/655 |
| 6,190,203 B1 | * | 2/2001 | Murakami et al. | 439/587 |
| 6,521,840 B1 | * | 2/2003 | Kreutz | 174/151 |
| 7,357,672 B2 | * | 4/2008 | Montena | 439/584 |
| 7,384,308 B2 | * | 6/2008 | Boehnlein et al. | 439/585 |
| 7,494,348 B1 | * | 2/2009 | Tyler et al. | 439/79 |

(Continued)

FOREIGN PATENT DOCUMENTS

| | | |
|---|---|---|
| DE | 1750095 A | 3/1971 |
| DE | 3920953 A1 | 1/1991 |

(Continued)

OTHER PUBLICATIONS

Search Report dated Aug. 1, 2013 issued in corresponding European application No. 11 00 6889.7.

(Continued)

*Primary Examiner* — Hoa C Nguyen
*Assistant Examiner* — Xanthia C Cunningham
(74) *Attorney, Agent, or Firm* — Bacon & Thomas, PLLC

(57) ABSTRACT

A power supply control device includes a body part in which a circuit block is accommodated; a first cable drawn outside from the body part to be connected to a charge circuit of an electric vehicle; a second cable drawn outside from the body part to be connected to a power source; and a sealing member sealing a gap between each of the cables and a corresponding cable passing port of the body part. The power supply control device further includes an outer restriction member provided at each of the cables on an outer side than the sealing member to prevent the corresponding cable from being bent.

16 Claims, 14 Drawing Sheets

(56) References Cited

U.S. PATENT DOCUMENTS

| | | | |
|---|---|---|---|
| 7,500,874 B2* | 3/2009 | Montena | 439/587 |
| 7,530,843 B1* | 5/2009 | Tesfay et al. | 439/587 |
| 7,540,772 B2* | 6/2009 | Sardi et al. | 439/581 |
| 7,575,476 B2* | 8/2009 | Tyler et al. | 439/607.04 |
| 7,633,011 B2* | 12/2009 | Bolante | 174/84 R |
| 7,650,055 B2* | 1/2010 | Cox et al. | 385/135 |
| 7,705,240 B2* | 4/2010 | Armstrong et al. | 174/74 R |
| 7,829,811 B2* | 11/2010 | Saito et al. | 200/564 |
| 7,939,769 B2* | 5/2011 | Hudlet et al. | 174/650 |
| 2004/0231881 A1 | 11/2004 | Muller et al. | |
| 2005/0167431 A1 | 8/2005 | Stora | |
| 2005/0233639 A1* | 10/2005 | Blosch et al. | 439/587 |
| 2006/0154522 A1* | 7/2006 | Bernhart et al. | 439/587 |
| 2007/0163799 A1* | 7/2007 | Barnhard et al. | 174/77 R |
| 2007/0212936 A1* | 9/2007 | Eckel et al. | 439/578 |
| 2008/0026639 A1* | 1/2008 | Sardi et al. | 439/610 |
| 2008/0073120 A1* | 3/2008 | Drotleff et al. | 174/77 R |
| 2008/0090469 A1* | 4/2008 | Owen et al. | 439/699.2 |
| 2008/0142261 A1* | 6/2008 | Pini | 174/77 R |
| 2009/0034165 A1* | 2/2009 | Tyler et al. | 361/622 |
| 2009/0035974 A1* | 2/2009 | Tyler et al. | 439/207 |
| 2009/0152004 A1* | 6/2009 | Bonvallat et al. | 174/77 R |
| 2009/0200987 A1* | 8/2009 | Saito et al. | 320/134 |

FOREIGN PATENT DOCUMENTS

| | | |
|---|---|---|
| EP | 0203269 B1 | 11/1991 |
| EP | 0695900 A1 | 2/1996 |
| EP | 1022834 A1 | 7/2000 |
| EP | 1399997 B1 | 9/2005 |
| JP | 7-94235 A | 4/1995 |
| JP | 2008-186670 A | 8/2008 |
| JP | 2009-234392 A | 10/2009 |
| JP | 2009-240053 | 10/2009 |
| JP | 2009-240053 A | 10/2009 |

OTHER PUBLICATIONS

Office Action dated Feb. 18, 2014 in corresponding Japanese Application No. 2010-188634 and English summary thereof.

* cited by examiner

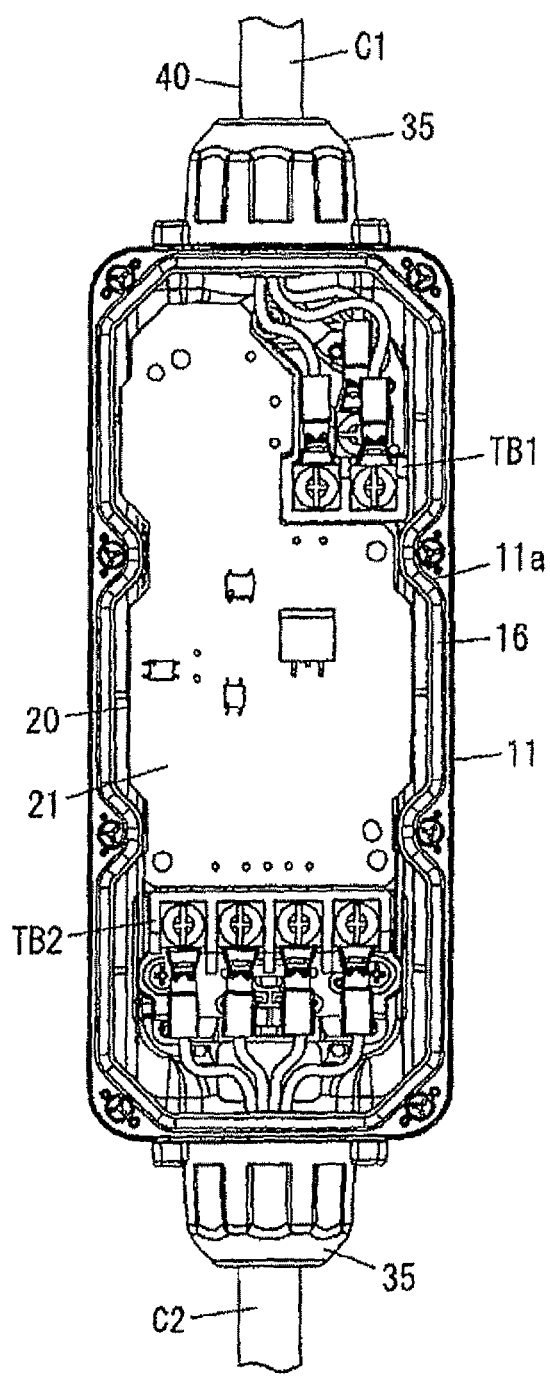 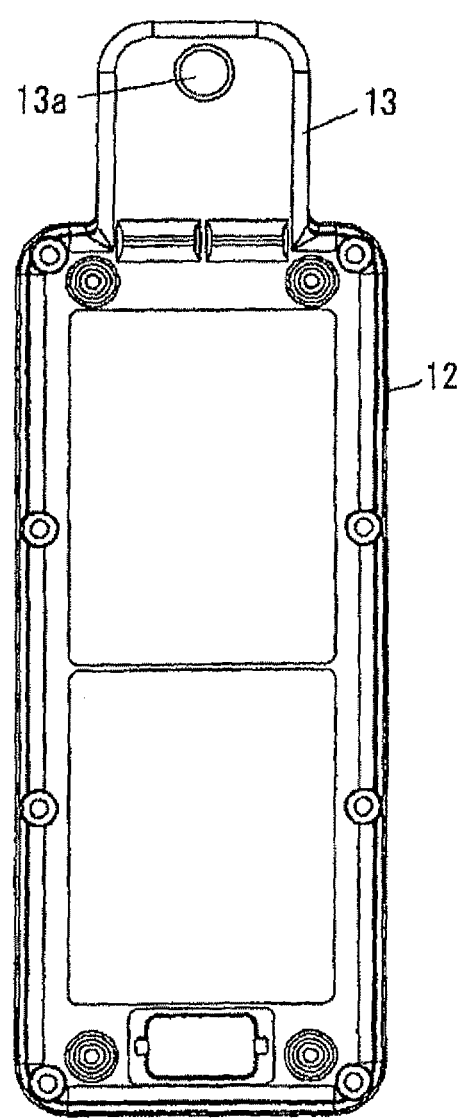

POWER SUPPLY CONTROL DEVICE

FIELD OF THE INVENTION

The invention relates to a power supply control device.

BACKGROUND OF THE INVENTION

In recent years, an electric vehicle driven by electric power, such as an electric vehicle (EV) with a storage battery and a plug-in hybrid vehicle (PHV), has been practically used. Such electric vehicle has an in-vehicle charger that receives electric power from an external power source, such as a commercial 100 Vac power source, to charge a built-in battery for traveling. Herein, if an electric leakage occurs on the vehicle side when the battery is charged, an excessive current may flow into the in-vehicle charger. Therefore, a power supply control device is used for intercepting the power supply to the electric vehicle when the leakage occurs (e.g., see Japanese Patent Application Laid-open No. 2009-240053).

FIG. 11 is a block circuit diagram of a power supply control device 101. The power supply control device 101 is configured to accommodate a relay 2, a zero-phase current transformer 3, a control circuit 4, and a power circuit 5 within a housing 110 (see FIG. 12). The power supply control device 101 is provided with a power side plug P1 connected to an external power source, and a vehicle side plug P2 connected to an in-vehicle charger in a vehicle. These plugs P1 and P2, and the circuits in the housing 110 are connected via cables C1 and C2. Now, the cable C1 between the power supply control device 101 and the power side plug P1 includes two power wires L1 and L2, and a ground wire L3. Further, the cable C2 between the power supply control device 101 and the vehicle side plug P2 includes the above three wires L1 to L3 and an electric wire L4 for transmitting signals to and from the in-vehicle chargers.

The relay 2 has relay contacts 2a provided in internal conductive lines connected to the power wires L1 and L2, respectively, and the control circuit 4 controls ON/OFF operations of the relay contact 2a.

The zero-phase current transformer 3 is used for detecting an unbalanced current that flows through the power wires L1 and L2 when the leakage occurs.

The control circuit 4 opens or closes the relay 2 based on control signals inputted from the in-vehicle charger of the electric vehicle via the electric wire L4, so that the power supply to the in-vehicle charger is turned off or on. Besides, when detecting the unbalanced current flowing through the zero-phase current transformer 3, the control circuit 4 opens the relay 2 to cut off the leak current flowing into the electric vehicle.

The power circuit 5, to which an electric power is supplied from the external power source, supplies the electric power to the control circuit 4.

The housing 110 of the power supply control device 101, as shown in FIG. 12, includes a body 111 with a rectangular parallelepiped shape of which one side is opened, and a cover 112 attached to the body 111 so as to cover the opening of the body 111. The relay 2, the zero-phase current transformer 3, the control circuit 4, and the power circuit 5, which are described above, are accommodated in an inner space defined by the body 111 and the cover 112. In opposite side walls of the body 111 in its longitudinal direction (up and down side walls in FIG. 12), joint portions with the cover 112 are each recessed to provide a cable passing port 17 for introducing the cable C1 or C2.

By the way, in view of wet circumstances in an outdoor parking space, the power supply control device 101 requires high waterproof performance. Higher waterproof performance needs complete sealing of the housing 110. The housing 110 is, however, configured to be opened and closed for replacement of the cables C1 and C2 when they are broken by, e.g., a vehicle passing over them. Each of the cables C1 and C2 introduced into the housing 110 is connected to a terminal box disposed within the housing 110 to be electrically connected to the internal circuit. On the other hand, the cables C1 and C2, which are connected to the respective terminal boxes, are extended to outside through the respective cable passing ports 17. Therefore, it becomes necessary to prevent, e.g., rain water from infiltrating into the housing 110 through the cable passing ports 17. Accordingly, in the power supply control device 101 disclosed in the above-cited reference, a gasket 50 provided on each of the cables C1 and C2 is attached to the cable passing port 17 to seal a gap between the body 111, the cover 112, and the cables C1 and C2.

The gasket 50, as shown in FIG. 13, has: a cylinder part 51 surrounding the cables C1 and C2; and a couple of flanges 52 and 53 protruding outwardly from the cylinder part 51 and sealing the gap between the body 111, the cover 112, and the cables C1 and C2. Further, in order to make the cylinder part 51 flexible, a plurality of annular grooves 54 extending circumferentially is formed on the cylinder part 51 at predetermined intervals in an axial direction thereof.

In the power supply control device with such configuration, the gasket 50 provided on each of the cables C1 and C2 is attached to the cable passing port 17 for the purpose of ensuring waterproof performance of the housing 110. When the cable C1 or C2 is bent in directions denoted by arrows A1 and A2 in FIG. 13A, the gasket 50 is hardly bent in conformity with the bending of the cable C1 or C2. This may cause a gap between an outer surface of the cable C1 or C2 and the gasket 50, which deteriorates the waterproof performance.

SUMMARY OF THE INVENTION

In view of the above, the present invention provides a power supply control device capable of ensuring waterproof performance even when a cable thereof extending to outside is bent by an external force applied thereto.

In accordance with an aspect of the present invention, there is provided a power supply control device including: a body part in which a circuit block is accommodated; a first cable drawn outside from the body part to be connected to a charging circuit of an electric vehicle; a second cable drawn outside from the body part to be connected to a power source; a sealing member sealing a gap between each of the cables and a corresponding cable passing port of the body part; and an outer restriction member provided at each of the cables on an outer side than the sealing member to prevent the cable from being bent.

In the power supply control device, an inner restriction member may be provided at each of the cables on an inner side than the sealing member.

In the power supply control device, the restriction members may have a substantially cylindrical shape formed independently of the body part, and each cable may be inserted thereinto.

In the power supply control device, a tension preventing member for receiving an external force applied to each cable may be provided on an outer side than the outer restriction member that is located on the outer side than the sealing member.

In the power supply control device, with respect to each cable, the sealing member, the restriction member, and the tension preventing member may be held by a cap member detachably attached to the body part.

In the power supply control device, the tension preventing member may include a tubular member whose inner diameter is decreased by being held by the cap member to prevent the corresponding cable from being tensioned. Besides, the body part and the tensile prevention member may be provided with depression-projection engaging parts that are engaged with each other in a circumferential direction of each cable to prevent the tension preventing member from rotating.

With such configurations, since the portion of each cable on the outer side than the sealing member is prevented from being bent by the outer restriction member, it becomes difficult to generate a gap between the sealing member and the cable. Therefore, the contact condition between the sealing member and the cable is stabilized, which improves the waterproof performance.

BRIEF DESCRIPTION OF THE DRAWINGS

The objects and features of the present invention will become apparent from the following description of embodiments, given in conjunction with the accompanying drawings, in which:

FIGS. 2A to 2D are views showing the power supply control device, wherein FIG. 2A is a front view, FIG. 2B is a top view, FIG. 2C is a bottom view, and FIG. 2D is a left side view;

FIG. 5A is a view showing inside of a body of the power supply control device with a cover separated therefrom, and FIG. 5B is a view showing inside of the separated cover;

DETAILED DESCRIPTION OF THE EMBODIMENT

Figure 1:
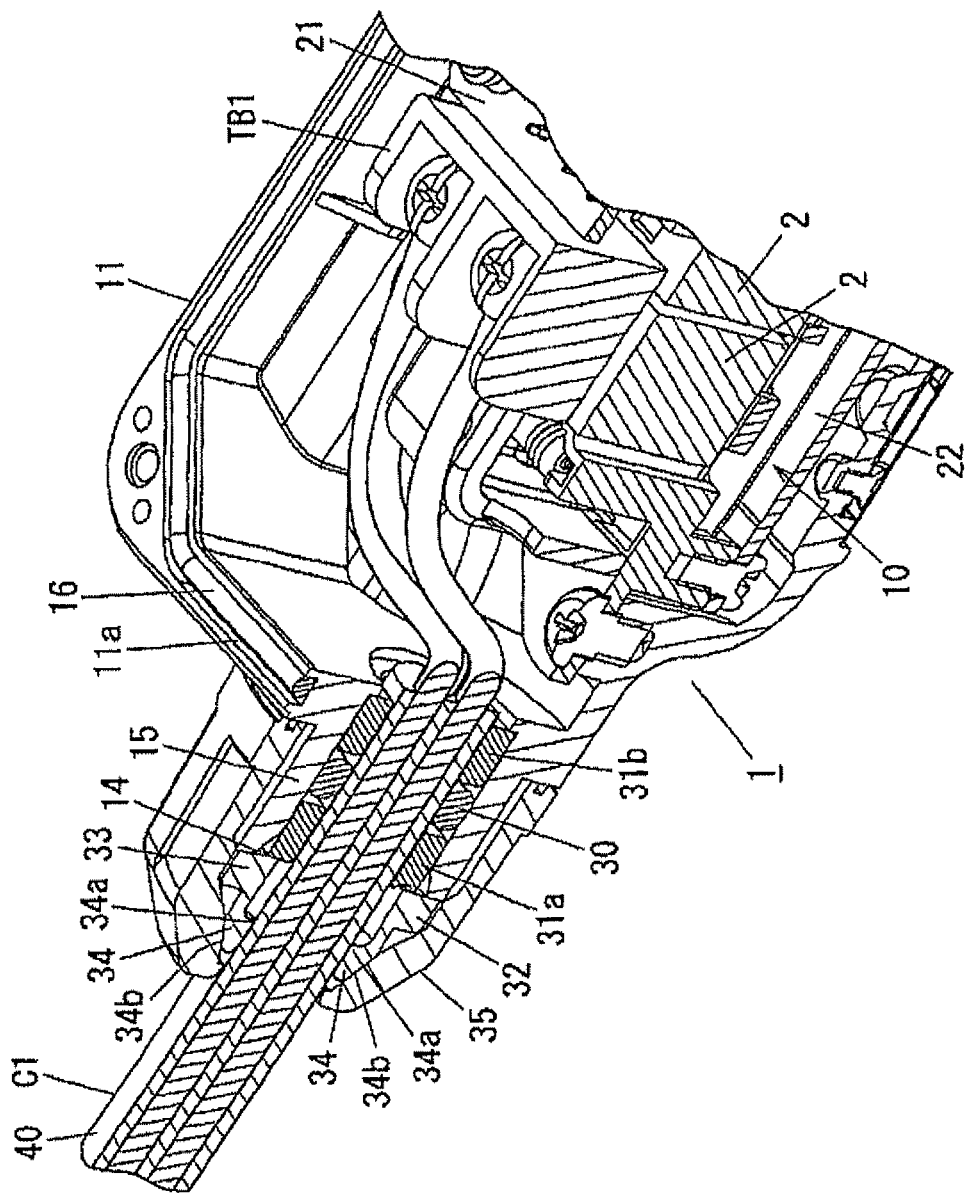
FIG. 1 is a cross-sectional perspective view showing a principal part of a power supply control device in accordance with an embodiment of the present invention.
Figure 2A:
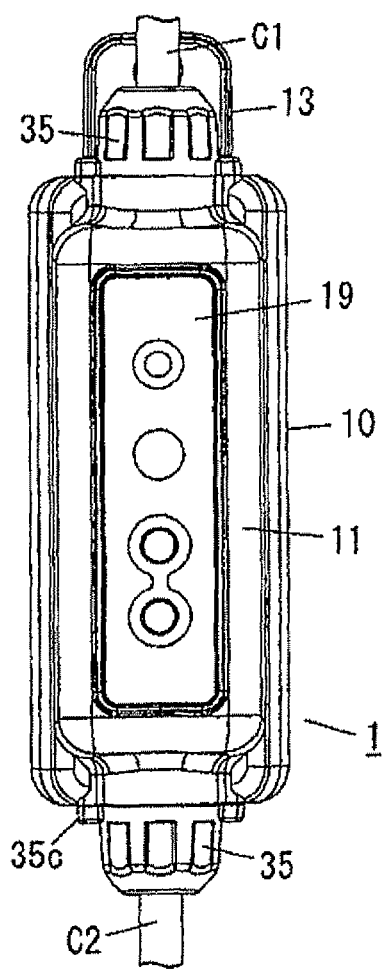
Figure 2B:
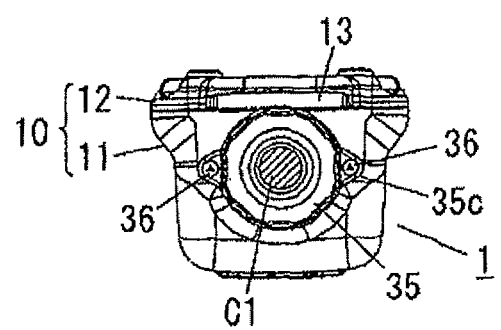
Figure 2C:
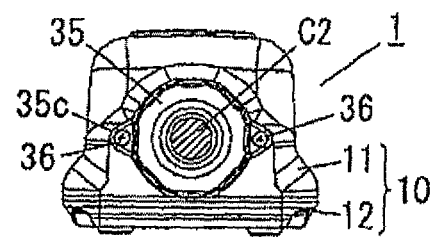
Figure 2D:
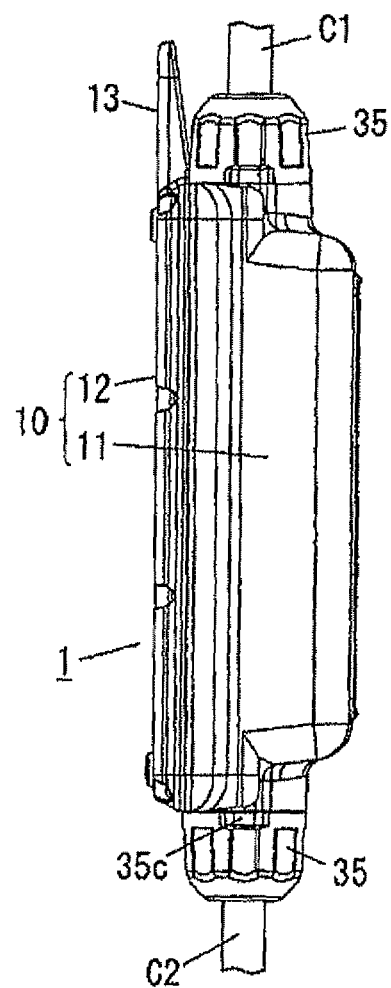
Figure 3:
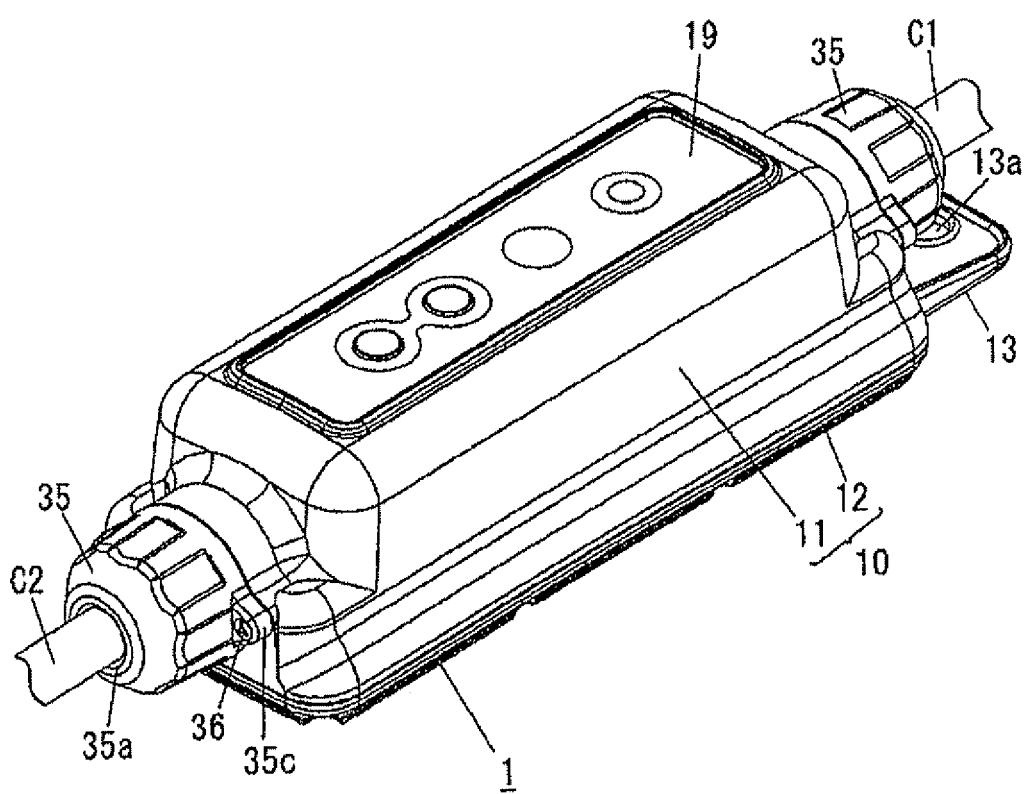
FIG. 3 is an external perspective view of the above power supply control device.
Figure 4:
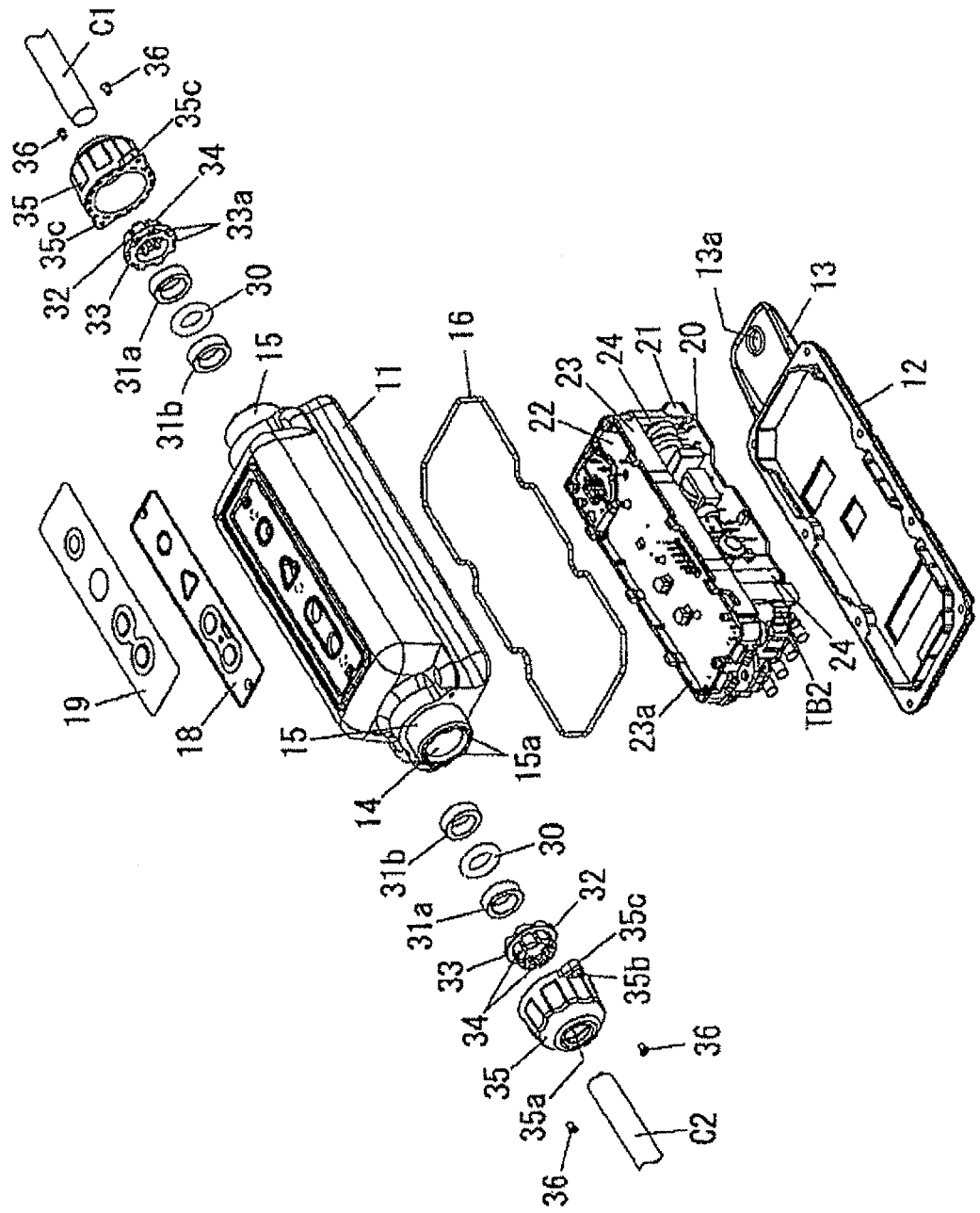
FIG. 4 is an exploded perspective view of the above power supply control device.
Figure 6:
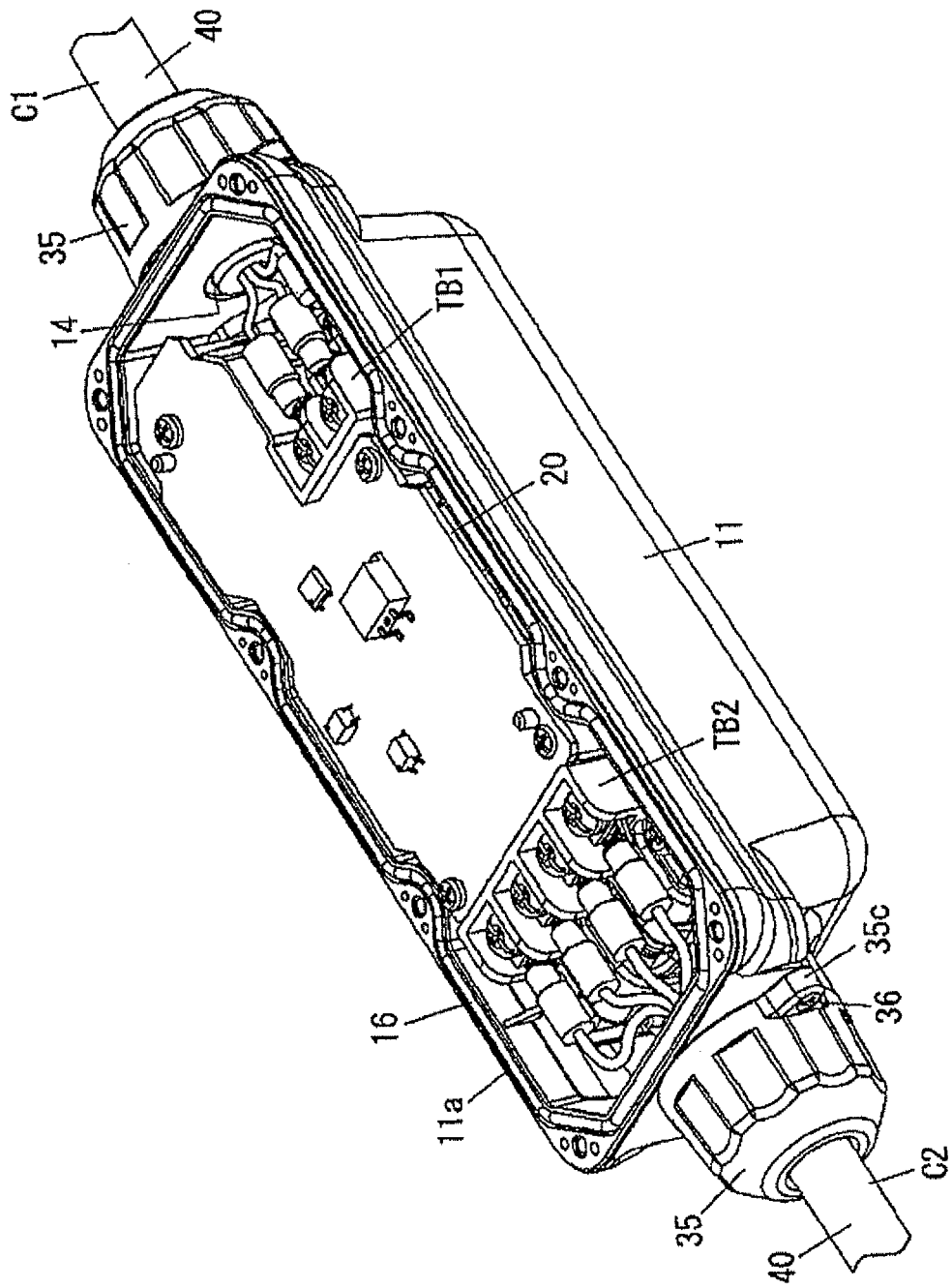
FIG. 6 is a rear side perspective view of the power supply control device with the cover separated therefrom.
Figure 7A:
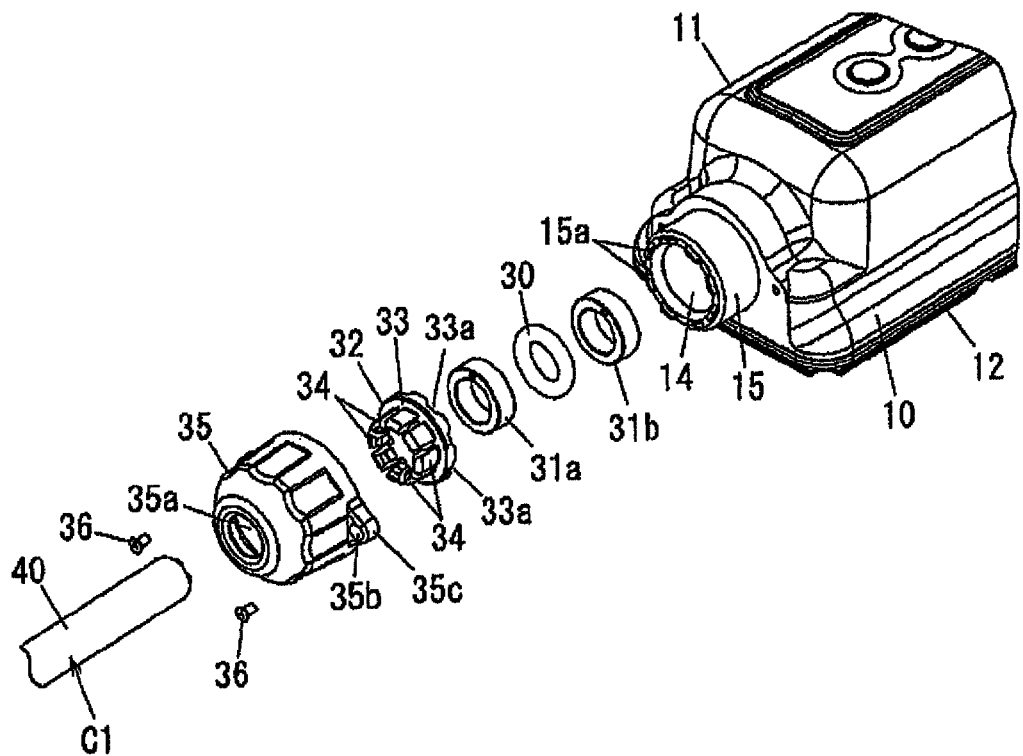
FIGS. 7A and 7B are exploded perspective views of a cable passing part of the power supply control device.
Figure 7B:
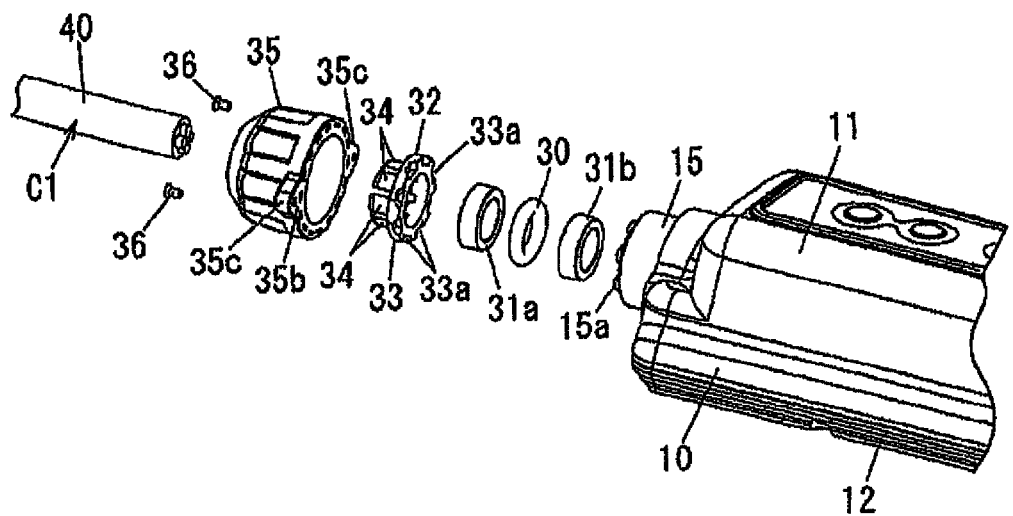
Figure 8:
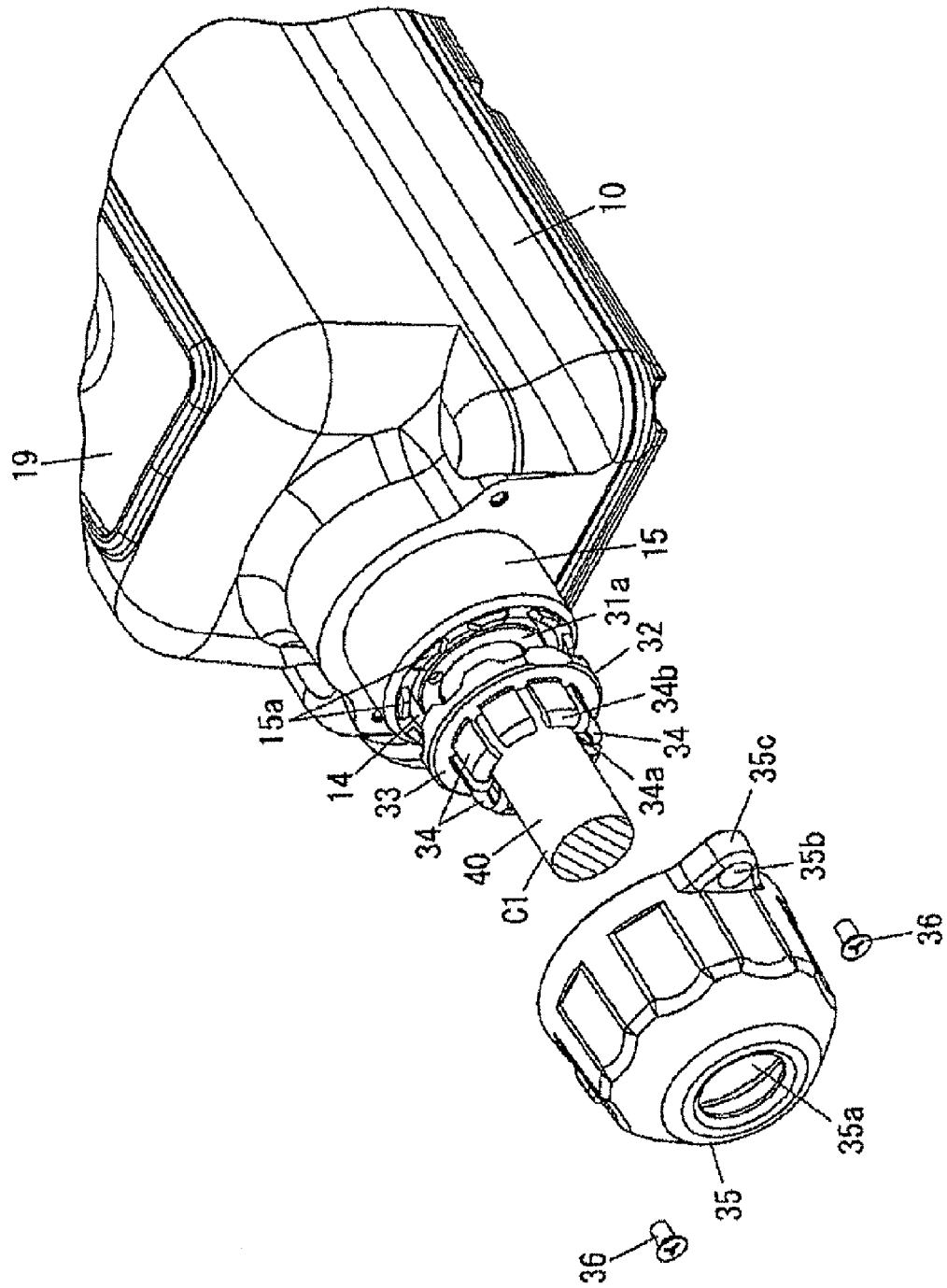
FIG. 8 is an enlarged perspective view showing a principal part of the power supply control device with a cap member separated therefrom.
Figure 9:
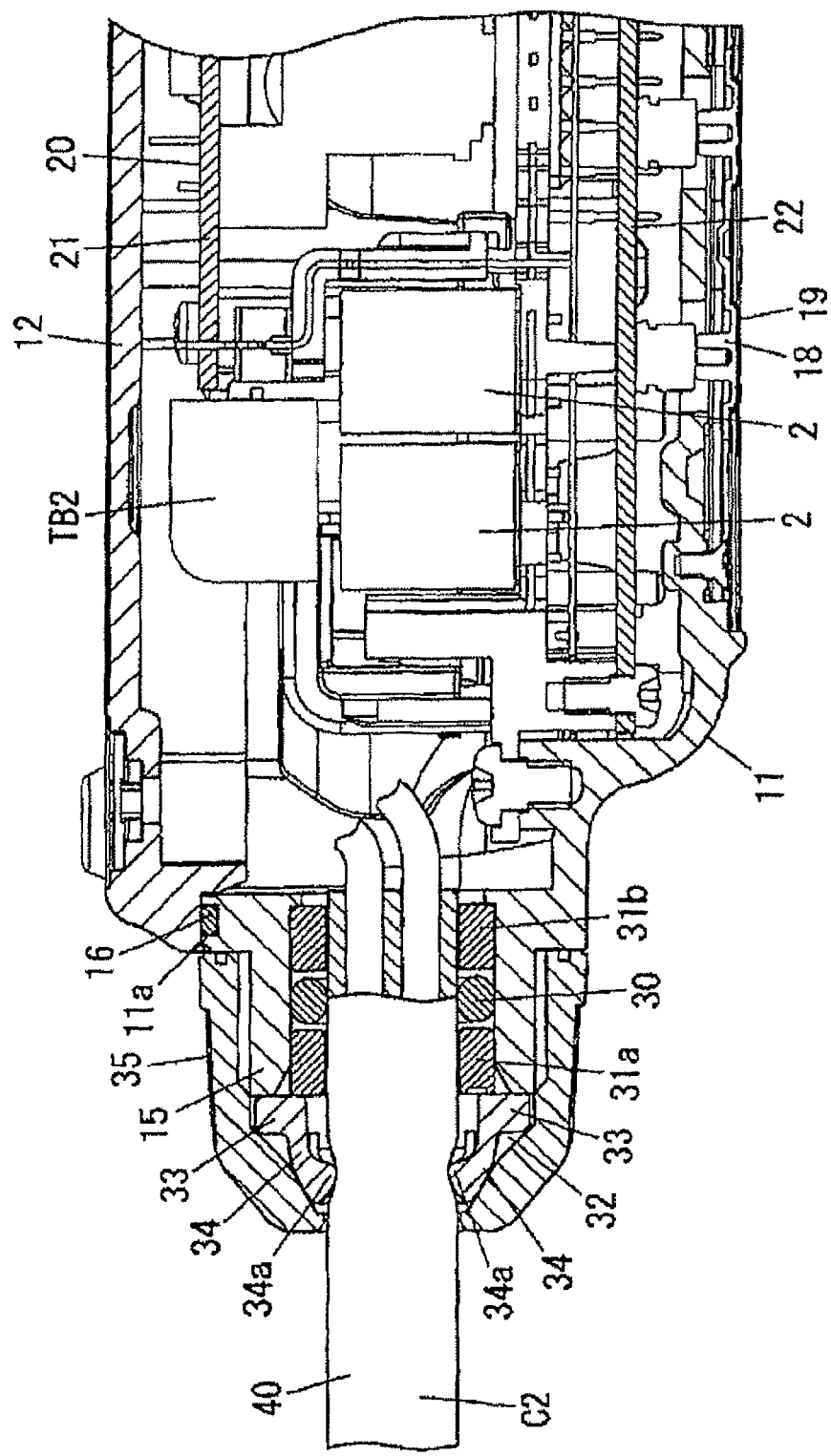
FIG. 9 is a cross-sectional side view showing the principal part of the power supply control device.
Figure 10:
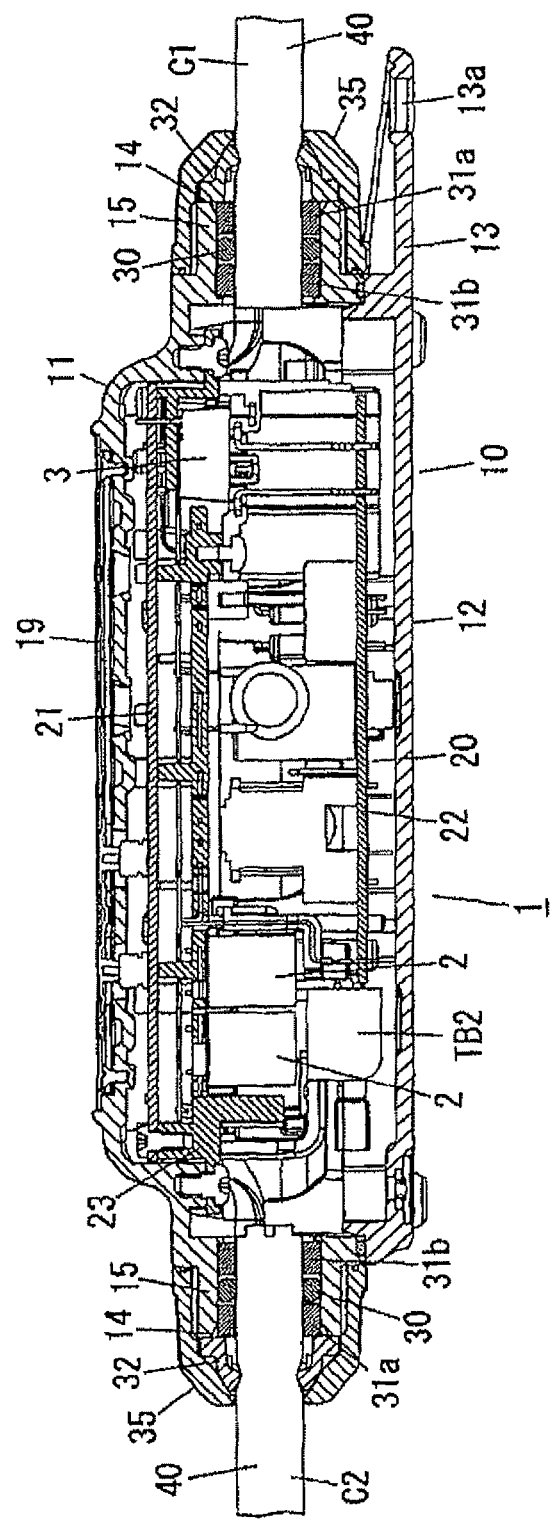
FIG. 10 is a cross-sectional side view of the power supply control device.

Hereinafter, an embodiment of a power supply control device in accordance with the present invention will be described with reference to the drawings. The power supply control device of the present embodiment is used for charging an electric vehicle (an electric vehicle of storage battery type, a plug-in hybrid car, and the like) at home, and is adapted to turn on and off power supply to a charging circuit provided in the electric vehicle. Hereinafter, up-down and left-right directions are defined based on the directions shown in FIG. 2A, and a front-rear direction is defined based on the right-left direction in FIG. 2D. However, the above directions are defined for convenience of explanation, and do not necessarily congruous with the directions in the actual use state of the power supply control device.

The power supply control device 1 includes a housing (body part) 10 having a body 11 with a rectangular parallelepiped shape of which one side is opened; and a cover 12 attached to the body 11 so as to close the opening of the body 11, as shown in FIGS. 2A to 6. A groove 11a is formed in end surfaces of side walls of the body 11 (facing the cover 12). When the body 11 and the cover 12 are coupled with screws in the state where an O-ring 16 is fitted into the groove 11a, a gap between the body 111 and the cover 12 is sealed with the O-ring 16. At one end of the cover 12 in a longitudinal direction thereof, a supporting part 13 protruding outwardly beyond the body 11 is provided. A through hole 13a is formed in the supporting part 13. By fitting the through hole 13a onto a pin which is fixed on such as a wall surface, the housing 10 can be hung on the wall.

A cable C1 (a second cable) to be connected to a power receptacle (not shown) is drawn out of the housing 10 from one side wall of the body 11 (on the side of the supporting part 13) in a longitudinal direction thereof. A cable C2 (a first cable) to be connected to a charging circuit (not shown) of an electric vehicle is drawn out of the housing 10 from another side wall of the body 11, which is opposite to the side wall from which the cable C1 is drawn. Note that, the cable C1 on the power source side includes power wires L1 and L2 to be connected to power terminals of an external power source such as a commercial power source 100 Vac; and a ground wire L3 to be connected to a ground terminal of the external power source. These three wires L1 to L3 are covered with an external shell 40 made of a flexible material (e.g., elastomer) to form the single cable C1. The cable C2 on the vehicle side includes two power wires L1 and L2, a ground wire L3, and an electric wire L4 for transmitting signals to and from an in-vehicle charger of an electric vehicle, which are covered with an external shell 40 to form the single cable C2.

In a front surface of the body 11, exposed holes are opened to expose various kinds of operation buttons and display lamps. A transparent cover 18 is attached to the front surface of the body 11 so as to cover these exposed holes. Besides, a label 19 is attached so as to cover the transparent cover 18, and the label 19 is provided with characters and symbols indicating functions of the operation buttons and the display lamps.

Figure 11:
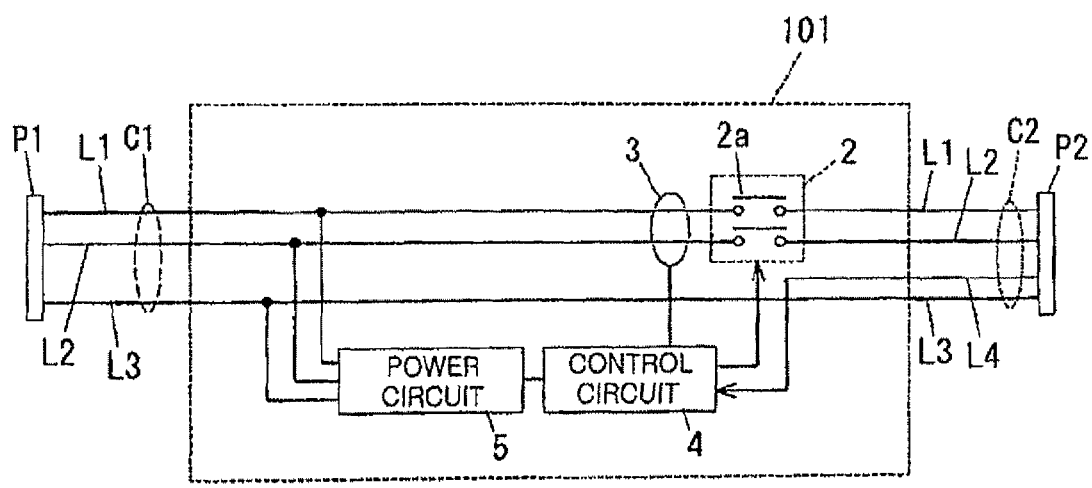
FIG. 11 is a block diagram of a conventional power supply control device.
Figure 12:
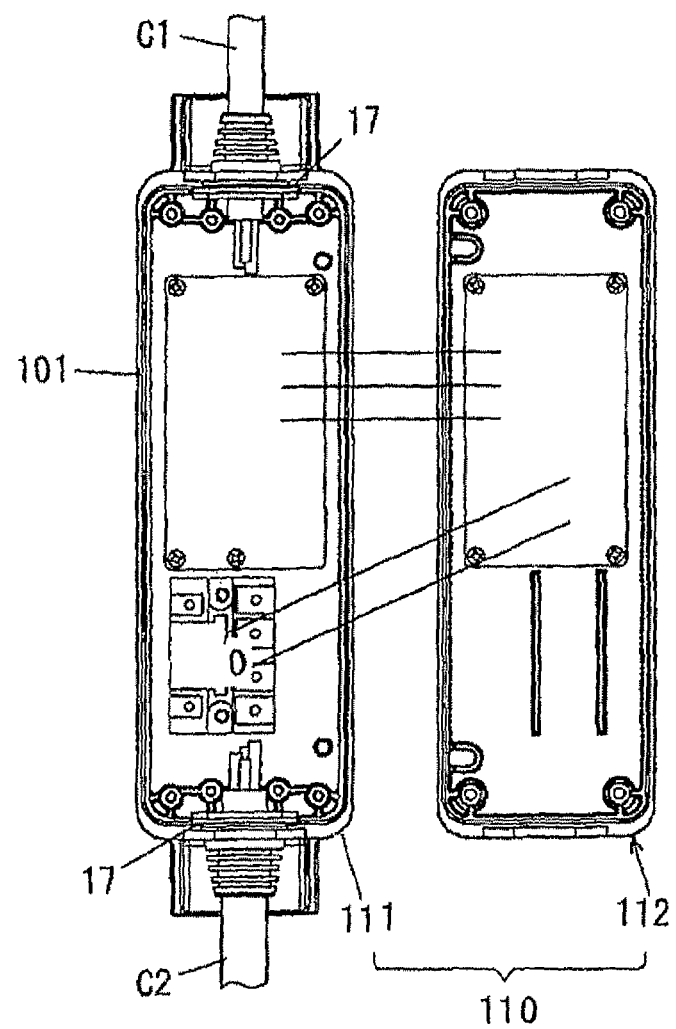
FIG. 12 is an explanatory view of the conventional power supply control device in which the body and the cover are separated from each other.
Figure 13A:
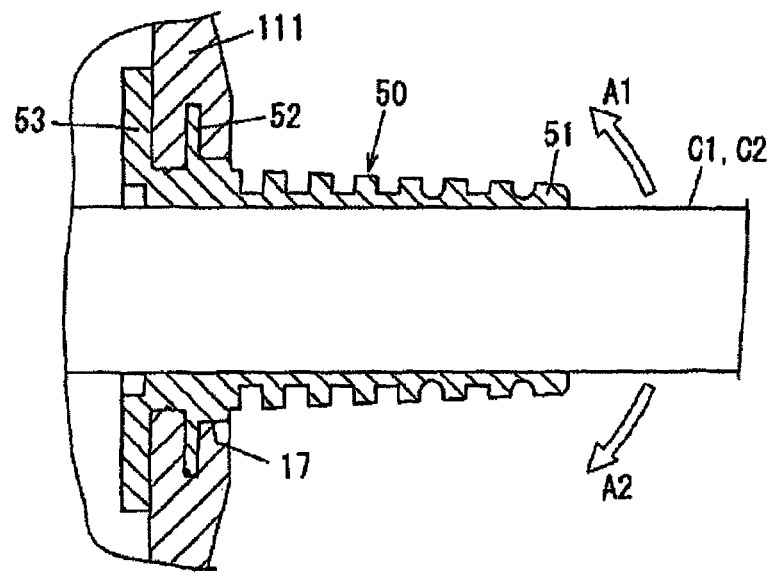
FIGS. 13A and 13B are respectively a cross-sectional view and a perspective view showing a portion around the cable passing port of the conventional power supply control device.
Figure 13B:
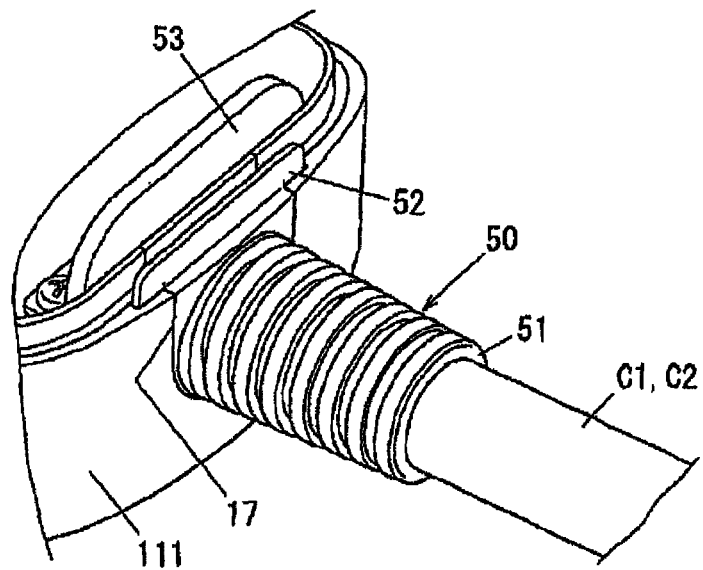

The power supply control device 1, like the power supply control device described in the Background of the Invention section, has such a circuit configuration as shown in FIG. 11 which mainly includes the relay 2, the zero-phase current transformer 3, the control circuit 4, and the power circuit 5.

The relay 2 has relay contacts 2a provided in conductive paths that are connected to the power wires L1 and L2 serving as power supply lines, respectively. An ON/OFF operation of the relay contact 2a is controlled by the control circuit 4.

The zero-phase current transformer 3 is used for detecting an unbalanced current flowing through the power wires L1 and L2 when current leakage occurs.

Based on signals inputted from the charging circuit of the electric vehicle via the electric wire L4, the control circuit 4 opens or closes the relay 2, so that power supply to the charging circuit is turned off or on. Further, when detecting the unbalanced current flowing into the zero-phase current transformer 3, the control circuit 4 opens the relay 2 to intercept power supply to the electric vehicle. The relay 2, the zero-phase current transformer 3, and the control circuit 4 constitute a current leakage breaker.

The power circuit 5 is connected to each of the power wires L1 and L2 and the ground wire L3 at points located closer to the external power source than the relay contacts 2a. The power circuit 5 receives power from the external power source and supplies a drive power to the control circuit 4.

Within the housing 10, a circuit block 20 including the above-described circuits is accommodated. This circuit block 20 includes: a first printed wiring board 21 on which the power circuit 5 is mounted; a second printed wiring board 22 on which the control circuit 4 is mounted; a terminal box TB1 to which the cable C1 is connected; and a terminal box TB2 to which the cable C2 is connected.

The terminal box TB1 has three terminals to which the wires L1 to L3 are respectively connected, and is disposed at one longitudinal end portion within the housing 10. The terminal box TB2 has four terminals to which the wires L1 to L4 are respectively connected, and is disposed at the other longitudinal end portion within the housing 10. The terminals of the terminal boxes TB1 and TB2, to which the wires L1 to L3 are connected respectively, are electrically connected therebetween via several bus bars (not shown) made of elongated metal plates. These bus bars are molded integrally with a mounting base 23 made of a resin-molding. The relay 2 is connected to each of the bus bars to which the power wires L1 and L2 are respectively connected. These two bus bars are extended through a center hole of an annular core with which the zero-phase current transformer 3 is provided.

Meanwhile, the mounting base 23 holding the bus bars has a substantially rectangular plate shape, and a side wall 23a is provided at a peripheral edge of the mounting base 23 to protrude from the peripheral edge in opposite thickness directions (back and forth directions). On one surface of the mounting base 23 (facing the bottom of the body 11), the second printed wiring board 22, on which the control circuit 4 is mounted, is attached to a region surrounded by the side wall 23a. On the other surface of the mounting base 23 (opposite to the body 11), the terminal boxes TB1 and TB2, the relays 2 and 2, and the zero-phase current transformer 3 are arranged. A plurality of columns is provided on the other surface of the mounting base 23, and a first printed wiring board 21, on which the power circuit 5 is mounted, is screwed to these columns. Since the first printed wiring board 21 is fixed to the mounting base 23 through the columns, a space is defined between the first printed wiring board 21 and the mounting base 23, and components of the power circuit 5 mounted on the first printed wiring board 21 is accommodated in the space.

As described above, the terminal boxes TB1 and TB2 are arranged at longitudinally opposite end portions within the body 11. Cylindrical bosses 15 are provided on the longitudinally opposite side walls of the body 11 to be protruded therefrom outwardly. Each of the bosses 15 is provided with a through-hole 14 communicating with the inside and the outside of the body 11. Through the through-hole 14 (cable passing port), the cables C1 and C2 are drawn out of the housing 10.

Inside each of the bosses 15, a sealing member 30 and outer and inner restriction members 31a and 31b, through which the cable C1 or C2 passes, are disposed. The sealing member 30 is formed of a flexible synthetic resin material, and preferably formed of, for instance, ethylene-propylene rubber with large elasticity, which can resist ultraviolet rays (namely, which has strong weather-resistance). The sealing member 30 is designed to have an inner diameter smaller than outer diameters of the cables C1 and C2, and to have an outer diameter larger than an inner diameter of the boss 15. On the other hand, the restriction members 31a and 31b are formed of a synthetic resin material having a small elasticity not to be deformed by an external force applied by the cables C1 and C2. Besides, the restriction members 31a and 31b are formed into a cylindrical shape which has an approximately rectangular shape in axial section, and are disposed on both sides of the sealing member 30. The restriction members 31a and 31b are designed to have an inner diameter substantially same as the outer diameters of the cables C1 and C2, and to have an outer diameter substantially equal to or smaller than the inner diameter of the boss 15. Accordingly, when the cable C1 or C2 is passed through the restriction members 31a and 31b, portions of the cable C1 or C2 held by the restriction members 31a and 31b remain their original shapes without being bent. Note that, the innermost portion of the through-hole 14 has an inner diameter smaller than that of the other portions. Further, the inner diameter of the innermost portion is designed to be larger than the outer diameters of the cables C1 and C2 and smaller than the outer diameters of the restriction members 31a and 31b. This prevents the restriction members 31a and 31b from entering an accommodation space within the housing 10 from the boss 15.

A tension preventing ring 32, through which the cables C1 and C2 are passed, is disposed on the outside of the boss 15. The tension preventing ring 32 includes an annular ring part 33 having an outer diameter approximately the same as that of the boss 15, the cable C1 or C2 passing through the annular ring part 33; and a plurality of pressing pieces 34 protruded from one side of the ring part 33 in its axial direction, the pressing pieces 34 being circumferentially spaced apart at regular intervals. At a tip end of each pressing piece 34, there is provided a claw 34a protruding toward the cable C1 or C2. On the opposite side to the claw 34a, each pressing piece 34 has a tapered surface 34b tapered as it goes to the tip end.

Then, the boss 15 is covered with a cap member 35 that is made of a synthetic resin and has a substantially cylindrical shape whose bottom surface has a cable passing hole 35a. Flanges 35c, each having an insertion hole 35b, are provided at diametrically opposite end portions of the cap member 35 on its opening side. Joint screws 36 inserted into the insertion holes 35b are screwed into screw holes provided in the body 11, respectively, so that the cap member 35 is fixed to the body 11. Note that a special screw of which a screw head is formed to have a Y-shaped groove is employed as the joint screw 36. Accordingly, since the joint screw 36 cannot be removed with a usual Phillips head screwdriver, the cap member 35 is prevented from being detached by general users.

Next, the configuration for sealing portions at which the cables C1 and C2 are drawn out of the housing 10, with reference to FIG. 1 and FIGS. 7 to 10, will be described in detail. First of all, the cables C1 and C2 on each of which the sealing member 30 and the restriction members 31a, 31b are fitted are inserted into the boss 15 from the outside of the body 11. Wires of the cable C1 or C2, which are inserted into the body 11 through the through hole 14 of the boss, are connected to the screw terminals corresponding to the terminal box TB1 or TB2 arranged in the body 11, respectively.

Secondly, the cap member 35, through which the cable C1 or C2 are inserted, covers over the boss 15 in the state where the ring part 33 of the tension preventing ring 32, through which the cable C1 or C2 are inserted, is in contact with the tip end surface of the boss 15. Thus, the cap member 35 is fixed to the body 11 with the joint screws 36 inserted through the respective insertion holes 35b. At this time, when the cap member 35 is pressed against the body 11 by tightening the joint screws 36, an internal surface of the cap member 35 will push the tapered surfaces 34b to deform the pressing pieces (pressing part) 34 inwardly (toward the cable C1 or C2). Consequently, the claws 34a of the pressing pieces 34 bite into the external shell 40 of the cable C1 or C2, thereby restricting the movement of the external shell 40 in its axial direction. This reduces the tension applied to the connection portion of terminal box TB1 or TB2 when the cable C1 or C2 is pulled. Note that, on the tip end surface of the boss 15, a plurality of projection parts 15a is provided at regular intervals circumferentially. When depression parts 33a provided on the tension preventing ring 32 are engaged with the projection parts 15a, the tension preventing ring 32 is prevented from rotating, thereby making it difficult to shift the positions of the pressing pieces 34.

As described above, in the power supply control device of the present embodiment, the gap between the inner surface of the through hole 14 provided in the body 11 (body part) and the cable C1 or C2 is sealed with the sealing member 30. Further, the outer restriction member 31a is fitted on the cable C1 or C2 on an outer side than the sealing member 30 fitted on the cable C1 or C2.

Since the outer restriction member 31a is hardly deformed and keeps its original shape, the portion of the cable C1 or C2 on the outer side than the sealing member 30, on which the outer restriction member 31a is fitted, is also hardly bent. Even if the cable C1 or C2 drawn outside from the cap member 35 are bent by an external force, the outer restriction member 31a inhibits the cable C1 or C2 from being bent, thereby making it difficult to bend the portion of the cable C1 or C2 on which the sealing member 30 is fitted. This enables to stabilize the contact condition between the sealing member 30 and the external shell 40 of the cable C1 or C2, which improves the waterproof performance of the sealing member 30.

Meanwhile, when the wires L1 to L4 introduced into the body 11 through the through hole 14 are bent within the body 11 for being connected to the terminal box TB1 or TB2, the bending force is applied to a portion of the cable C1 or C2 on the inner side than the sealing member 30. In the present embodiment, the inner restriction member 31b is fitted on the portion of the cable C1 or C2 on the inner side than the sealing member 30.

Since the inner restriction member 31b is hardly deformed and keeps its original shape, the portion of the cable C1 or C2 on the inner side than the sealing member 30, on which the inner restriction member 31b is fitted, is also hardly bent. Even if the bending force is applied to the inner portion of the cable C1 or C2, the inner restriction member 31b inhibits the cables C1 or C2 from being bent, thereby making it difficult to bend the portion of the cable C1 or C2 on which the sealing member 30 is fitted. This enables to stabilize the contact condition between the sealing member 30 and the external shell 40 of the cable C1 or C2, which improves the waterproof performance of the sealing member 30.

In the present embodiment, the restriction members for preventing the cables C1 and C2 from being bent are provided independently of the body part (body 11), and include the restriction members 31a and 31b formed into a cylindrical shape of which inner diameter has the same dimension as the outer diameter of the respective cables C1 and C2.

Accordingly, by inserting the cable C1 or C2 into the through hole 14 of the body 11 after passing the cable C1 or C2 through the sealing member 30 and the restriction members 31a and 31b, the sealing member 30 and the restriction members 31a and 31b can be assembled into the body 11. Therefore, the present embodiment is advantageously improved in assembly working efficiency as compared with the case where the sealing member 30 and the restriction members 31a and 31b are assembled independently.

Furthermore, in the present embodiment, the tension preventing ring 32 (tension preventing member), which receives an external force applied to each of the cables C1 and C2, is further provided at a position on an outer side than the outer restriction member 31a, which is located at a position on the outer side than the sealing member. The sealing member 30, the restriction members 31a and 31b, and the tension preventing ring 32 are held in the body 11 (housing 10) by the cap member 35 detachably attached to the body 11.

Accordingly, an empty space near the through hole 14 can be enlarged within the housing 10 as compared with the case where the tension preventing member is disposed in the housing 10. By utilizing the empty space, it becomes possible to accommodate excessive length of the electric wires connected to terminal boxes TB1 and TB2, thereby enabling the housing 10 to be miniaturized as compared with the case where a separate space for accommodating the excessive length is provided. Since no tension preventing member exists in the space for accommodating the excessive length of the electric wires, the tension preventing member is avoided from being an obstacle in wiring work, thereby improving workability of the wiring work.

Still further, in the present embodiment, the tension preventing ring 32 serving as a tension preventing member, through which each of the cables C1 and C2 is inserted, includes a cylindrical member having the pressing pieces 34 (pressing part) that are held by the cap member 35 to press the external shell 40. On the body 11 and the tension preventing ring 32, there are respectively provided the depression-projection engaging parts engaged with each other in a circumferential direction of the cables C1 and C2 to prevent the tension preventing ring 32 from rotating. In the present embodiment, the depression-projection engaging parts includes: the projection parts 15a provided on the boss 15 of the body 11; and the depression parts 33a provided on the tension preventing ring 32 and engaged with the projection parts 15a to prevent the tension preventing ring 32 from rotating.

Since the depression parts 33a on the tension preventing ring 32 and the projection parts 15a on the boss 15 are engaged with each other to restrict the rotation of the tension preventing ring 32, the cable C1 or C2 are hardly rotated even if an external force is applied so as to rotate the cable C1 or C2. Accordingly, the contact condition between the sealing member 30 and the external shell 40 of the cable C1 or C2 is stabilized, which improves the waterproof performance of the sealing member 30. Note that, the depression-projection engagement parts may include depression parts provided on the boss 15 and projection parts provided on the tension preventing ring 32.

Meanwhile, in the present embodiment, alternating current power is supplied from an electric power system as the external power, but direct current power, for example, may be supplied from a solar cell and a fuel cell installed in a house.

Further, the control circuit 4 controls the ON/OFF operation of the relay 2 according to the control signal transmitted via the electric wire L4 from the electric vehicle, but it is not necessary to adopt the configuration of communicating with the electric vehicle. For instance, the control circuit 4 may turn off the relay 2 automatically when predetermined time elapses after the relay 2 is turned on. Furthermore, a switch is provided in the housing 10 and an ON/OFF operation of the relay 2 may be controlled in accordance with the control signal inputted from the switch.

While the invention has been shown and described with respect to the embodiments, it will be understood by those skilled in the art that various changes and modification may be made without departing from the scope of the invention as defined in the following claims.

What is claimed is:

1. A power supply control device, comprising:
a body part in which a circuit block is accommodated;
a cable drawn outside from the body part;
a cable passing port communicating with an inside and an outside of the body part, wherein the cable passes therethrough;
a sealing member provided between the cable and an inner surface of the cable passing port;
an outer restriction member provided between the cable and the inner surface of the cable passing port cable from being bent, and
a tension preventing member for receiving an external force applied to the cable;
wherein the cable is inserted through the sealing member and the outer restriction member,
wherein the sealing member is disposed between the outer restriction member and the circuit block, and
wherein the cable is inserted through the tension preventing member, and the outer restriction member is disposed between the tension preventing member and the sealing member.

2. The power supply control device as set forth in claim 1, further comprising an inner restriction member through which the cable is inserted, wherein the inner restriction member is disposed between the sealing member and the circuit block.

3. The power supply control device as set forth in claim 2, wherein each of the inner and outer restriction members has a substantially cylindrical shape formed independently of the body part.

4. The power supply control device as set forth in claim 2, further comprising a cap member detachably attached to the body part, wherein the sealing member, the outer restriction member, and the tension preventing member are held by the cap member.

5. The power supply control device as set forth in claim 3, further comprising a cap member detachably attached to the body part, wherein the sealing member, the outer restriction member, and the tension preventing member are held by the cap member.

6. The power supply control device as set forth in claim 5, wherein the tension preventing member includes a pressing part which presses against an external shell of the cable by being held by the cap member, and
wherein depression-projection engaging parts are provided on the body part and the tension preventing member and engaged with each other to prevent the tension preventing member from rotating.

7. The power supply control device as set forth in claim 4, wherein the tension preventing member includes a pressing part which presses against an external shell of the cable by being held by the cap member, and
wherein depression-projection engaging parts are provided on the body part and the tension preventing member and engaged with each other to prevent the tension preventing member from rotating.

8. The power supply control device as set forth in claim 1, wherein the outer restriction member has a substantially cylindrical shape formed independently of the body part.

9. The power supply control device as set forth in claim 8, further comprising a cap member detachably attached to the body part, wherein the sealing member, the outer restriction member, and the tension preventing member are held by the cap member.

10. The power supply control device as set forth in claim 9, wherein the tension preventing member includes a pressing part which presses against an external shell of the cable by being held by the cap member, and
wherein depression-projection engaging parts are provided on the body part and the tension preventing member and engaged with each other to prevent the tension preventing member from rotating.

11. The power supply control device as set forth in claim 1, further comprising a cap member detachably attached to the body part, wherein the sealing member, the outer restriction member, and the tension preventing member are held by.

12. The power supply control device as set forth in claim 11, wherein the tension preventing member includes a pressing part which presses against an external shell of the cable by being held by the cap member, and
wherein depression-projection engaging parts are provided on the body part and the tension preventing member and engaged with each other to prevent the tension preventing member from rotating.

13. The power supply control device as set forth in claim 12, wherein the pressing part has a claw protruding toward the cable at a tip end thereof and a tapered surface tapered as it goes to the tip end on the opposite side to the claw.

14. The power supply control device as set forth in claim 12, wherein the body part has cylindrical bosses provided on longitudinally opposite side walls of the body part to be protruded outwardly therefrom, and the depression-projection engaging parts include projection parts provided at regular intervals circumferentially on a tip end surface of each of the bosses and depression parts provided on the tension preventing member to be engaged with the projection parts.

15. The power supply control device as set forth in claim 1, wherein each of the sealing member and the outer restriction member is formed of a synthetic resin material.

16. The power supply control device as set forth in claim 1, wherein an innermost portion of the cable passing port has an inner diameter smaller than that of the other portions of the cable passing port, and the inner diameter of the innermost portion is larger than an outer diameter of the cable and smaller than an outer diameter of the outer restriction member.

* * * * *